United States Patent
Paschich

(10) Patent No.: US 7,775,165 B2
(45) Date of Patent: Aug. 17, 2010

(54) COLLAPSIBLE FURNITURE AND METHOD TO COLLAPSE AND ASSEMBLE USING A PLUG JOINT SYSTEM

(76) Inventor: Wristen Paschich, P.O. Box 1877, Corrales, NM (US) 87048

( * ) Notice: Subject to any disclaimer, the term of this patent is extended or adjusted under 35 U.S.C. 154(b) by 422 days.

(21) Appl. No.: 11/700,296

(22) Filed: Jan. 30, 2007

(65) Prior Publication Data

US 2007/0209560 A1 Sep. 13, 2007

Related U.S. Application Data

(60) Provisional application No. 60/763,487, filed on Jan. 30, 2006.

(51) Int. Cl.
*A47B 13/00* (2006.01)
(52) U.S. Cl. .................. 108/157.16; 108/159
(58) Field of Classification Search .......... 108/153.1, 108/157.16, 154, 156, 159, 157.1, 158.11, 108/158.12, 90, 93, 101, 91, 180, 184, 186; 248/188, 188.1, 188.8; 403/361
See application file for complete search history.

(56) References Cited

U.S. PATENT DOCUMENTS

| | | | | |
|---|---|---|---|---|
| 1,675,827 A * | 7/1928 | Shrader | ............ | 108/156 |
| 1,759,749 A * | 5/1930 | Knight | ............ | 211/134 |
| 2,582,997 A * | 1/1952 | Laurent | ............ | 220/243 |
| 2,698,775 A * | 1/1955 | Courtwright | ............ | 403/192 |
| 2,849,201 A * | 8/1958 | Schelgunov | ............ | 248/615 |
| 3,182,846 A * | 5/1965 | La Kaff | ............ | 220/4.28 |
| 3,236,003 A * | 2/1966 | Flood, Jr. | ............ | 446/110 |
| 3,255,721 A * | 6/1966 | Peterschmidt | ............ | 108/186 |
| 3,510,159 A * | 5/1970 | Rosen et al. | ............ | 403/263 |
| 3,854,831 A * | 12/1974 | Gutner | ............ | 403/292 |
| 3,869,993 A * | 3/1975 | Edlund | ............ | 108/101 |
| 4,119,045 A * | 10/1978 | Michelotti | ............ | 108/156 |
| 5,873,762 A * | 2/1999 | de Chazal | ............ | 446/75 |
| 6,123,035 A * | 9/2000 | Pfister | ............ | 108/180 |
| 6,769,747 B2 * | 8/2004 | Chan et al. | ............ | 108/157.16 |
| 7,155,867 B2 * | 1/2007 | Saldarelli et al. | ............ | 52/292 |
| 2003/0051644 A1 * | 3/2003 | Chaudoreille | ............ | 108/180 |
| 2005/0103238 A1 * | 5/2005 | Paventi | ............ | 108/91 |
| 2007/0163980 A1 * | 7/2007 | Gonzalez Llorens | ............ | 211/189 |

FOREIGN PATENT DOCUMENTS

| | | | |
|---|---|---|---|
| DE | 44 11 394 | * | 10/1994 |
| DE | 29613530 | * | 9/1996 |
| JP | 2005232833 | * | 9/2005 |
| SU | 598603 | * | 2/1978 |

* cited by examiner

*Primary Examiner*—Janet M Wilkens
(74) *Attorney, Agent, or Firm*—Alberto A. León, Esq.; Simone M. Seiler; Bouman, Don & León, P.C.

(57) ABSTRACT

Plug joint system and method of use are described for collapsible furniture. This new type of furniture joinery results in furniture which can quickly and easily be assembled, disassembled, transported, stored and reassembled. The joint comprises a tapered plug, a square hole at the top end of one furniture part for receiving the plug, and another furniture part with an opening through which the first furniture part is inserted. Each corner of the square hole has a vertical relief cut, allowing the four sides to expand outward when the plug is driven into the hole, securely fixing the two furniture parts together. The plug can easily be dislodged from the square hole by applying pressure from the bottom of the hole.

5 Claims, 3 Drawing Sheets

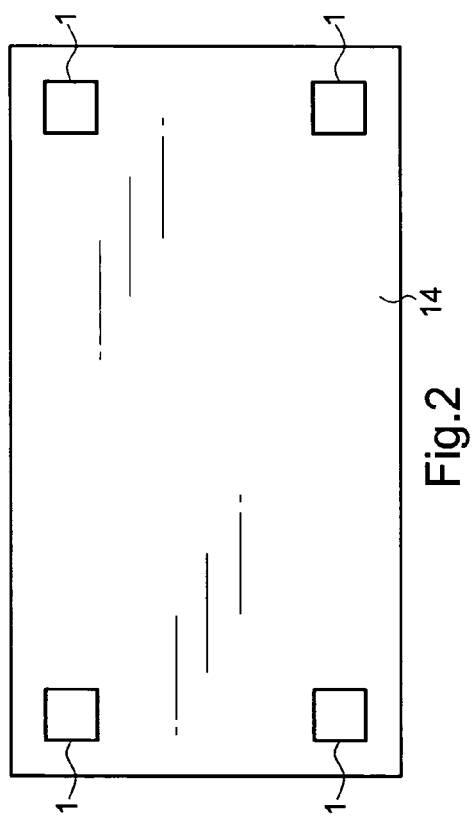
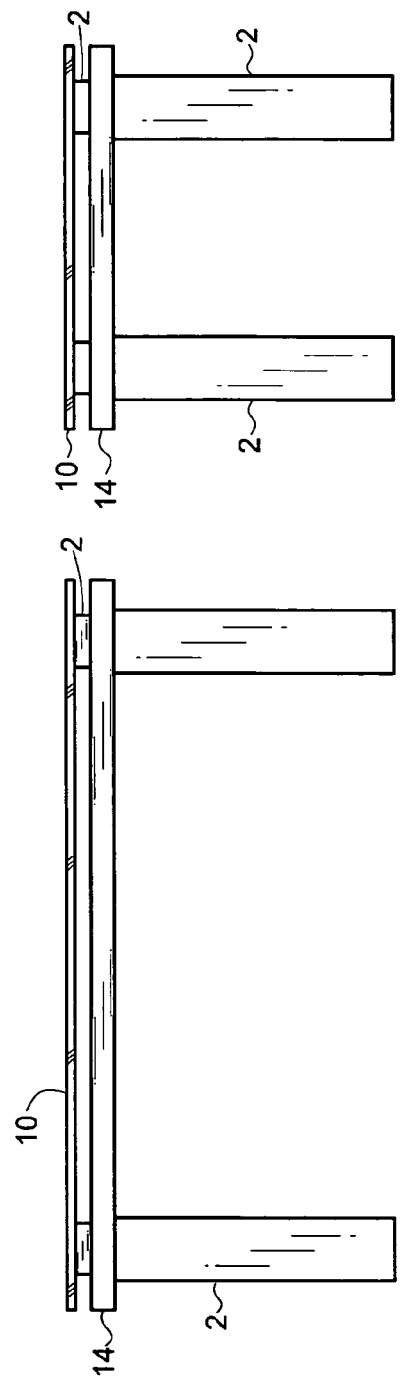
Fig.2
Fig.3
Fig.4

COLLAPSIBLE FURNITURE AND METHOD TO COLLAPSE AND ASSEMBLE USING A PLUG JOINT SYSTEM

CROSS-REFERENCE TO RELATED APPLICATION

I hereby claim the benefit under Title 35, United States Code Section 119(e) of any U.S. Provisional Application(s) listed below:

Application No. 60/763,487 Filing Date Jan. 30, 2006

BACKGROUND OF THE INVENTION

1. Technical Field of the Invention

This invention relates generally to furniture and, more particularly, but not by way of limitation, to collapsible furniture and a method to collapse and assemble collapsible furniture using plug joint technology.

2. Description of the Background Art

Historically, the word "collapsible" has been equated with "foldable" or "easy to disassemble" when used in connection with furniture. For example, U.S. Pat. No. 3,972,562 to Montrose for Collapsible Furniture, discloses and claims a foldable chair. U.S. Pat. No. 4,114,542 discloses and claims foldable furniture, including a chair, a table and a stool. There are many different ways of collapsing furniture by folding it, as disclosed and claimed in U.S. Pat. No. 5,562,050 which discloses a system using corner hinges to facilitate folding furniture.

Other examples of collapsible furniture are contained in patents disclosing and claiming furniture which can be disassembled to for ease of storage or transportation. Examples of those systems are presented in U.S. Pat. Nos. 4,928,333 to Ewert (collapsible chair) and 4,141,590 to Lafer (collapsible bed).

Although, as illustrated herein above, the prior art reveals many types of collapsible furniture and many methods of collapsing furniture, there are aspects of the art which have not been fully explored or realized. The majority of collapsible furniture still relies on the utilization of metal hardware, hinges or fasteners of some sort.

Practically, the mere fact furniture can somehow be disassembled, does not make it "collapsible." In today's trend toward easing and reducing the steps necessary to carry out any task, it is necessary that collapsing furniture takes place easily, with a minimum of steps, quickly, and overall in a user-friendly manner, resulting in a "bundle" which can be easily stored and/or transported. Any collapsing and re-assembling instructions must be easy to follow. The user of collapsible furniture must be able to reproduce the collapsing and reassembling steps easily without having to consult any sketches or instructions after a few uses. Also, the sustained repetition of collapsing and reassembling steps over a long period of time should not result in undue ware and tear of the parts involved or of the furniture itself. Finally, any collapsible furniture design must be easy to produce en masse and simple enough to be affordable to every day consumers.

This invention was borne from frustration with contemporary furniture design and construction techniques. Furniture which is marketed as cheap and affordable as well as intelligently designed always seems to pose an assembly nightmare. The furniture market now appears to be flooded with do-it-yourself kits, all containing lengthy instruction manuals as well as several bags of hardware and cheap hand-tools. The process of assembly of the collapsible furniture of today's market is usually lengthy, difficult and confusing. Once the piece of furniture is finally assembled, the prospect of disassembly can be daunting. The problems mentioned herein have lead to the discouraging trend of "throw away furniture". People move to a new city, buy cheap furniture, and either leave it, or give it away when the time to move comes again. As our society becomes increasingly mobile, our furniture designers have to react.

SUMMARY OF THE INVENTION

As a direct response to some of the problems of the prior art and resulting societal trends, this application discloses and claims a new type of joinery for furniture which, when incorporated in multiple designs, results in furniture which can be easily assembled, disassembled, moved, stored and reused. All of the above-mentioned steps can be taken repeatedly with sustainable durability and ease. The joint disclosed and claimed in this application comprises a plug which has four vertical sides tapering from the top to the bottom, creating a four-sided truncated pyramid. This plug is received by a square hole. As the plug is driven further and further into the hole, its inner sides expand outward and tighten, creating a secure fit. This expansion is enabled by vertical relief cuts at each of the four corners of the square hole extending downward for several inches from the top end of the hole.

BRIEF DESCRIPTION OF THE DRAWINGS

FIG. 2: is a top view of my fully-assembled collapsible furniture;

FIG. 3: is a side view of my fully-assembled collapsible furniture;

FIG. 4: is a frontal view of my fully-assembled collapsible furniture;

DETAILED DESCRIPTION OF THE DRAWINGS

Figure 1:
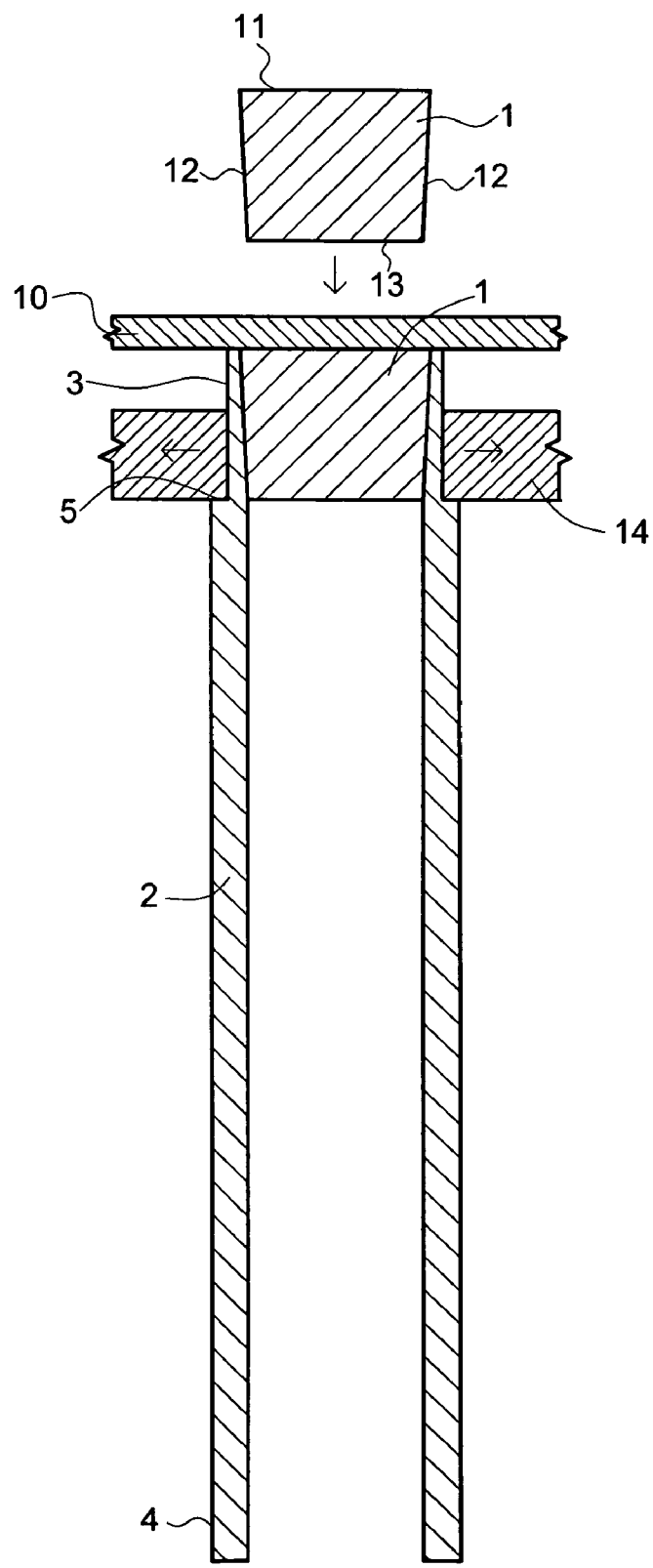
FIG. 1: is a side view of the square plug shown above a side, cross-sectional view of the plug in the square hole.
Figure 5:
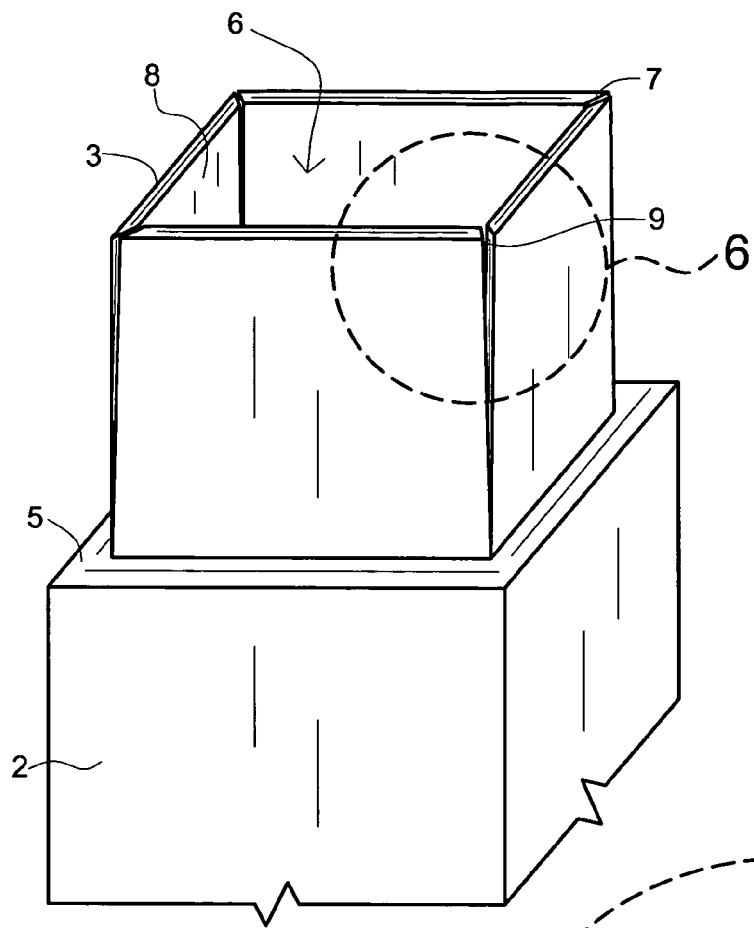
FIG. 5: is a perspective view of the first furniture part of the invention.
Figure 6:
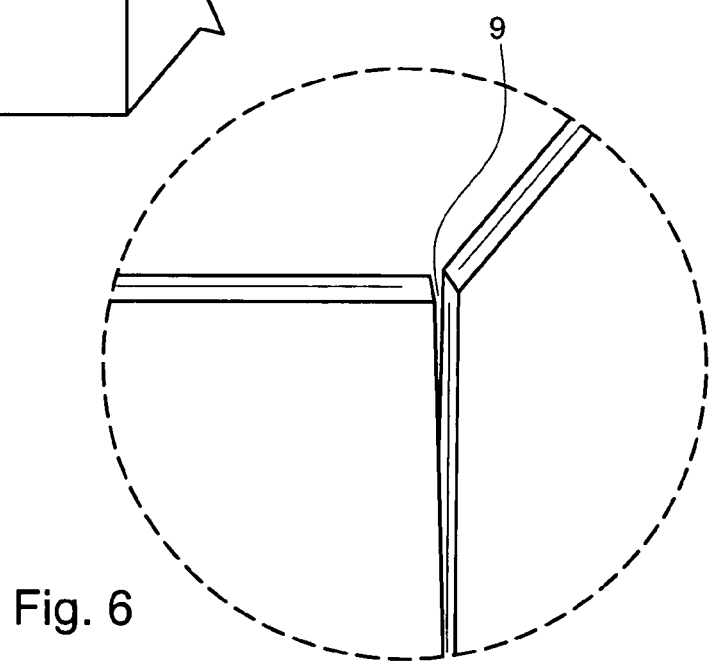
FIG. 6: is a close-up perspective view of the top end of the first furniture part of the invention.

The preferred embodiment of the joint of the present invention comprises a square plug (1) and two parts of a piece of furniture which will be joined. The plug comprises a top (11) side and a bottom side (12) and four vertical sides (13), with each vertical side tapering toward the bottom side to form a truncated pyramid.

The first furniture part (2) is hollow and comprises a top end (3), a bottom end (4) and a ledge (5) near the top end. The ledge (5) is created by a descending cut in the sides of the furniture part extending several inches from the top end. This ledge (5) is capable of receiving another furniture part. The top end (3) comprises a square hole (6) for receiving the plug, the square hole comprising four corners (7) and four receiving insides (8). The four receiving insides (8) of the square hole are slightly smaller than the four vertical sides (13) of the plug (1), and each of the four corners (7) have vertical relief cuts (9) at 45° angles extending from the top end (3) downward for two inches. Because of the relief cuts, the receiving insides are capable of expanding outward at the same rate as the plug vertical sides when the plug (1) is inserted into the square hole (6) in order to securely fix the top end of the first furniture part (2) to the second furniture part (14) and to maximize surface area contact between the receiving insides and the vertical sides.

The second furniture part (14) comprises at least one opening capable of joining the first furniture part (2) and resting on the ledge (5) of the first furniture part. The opening is very slightly larger than the top end (3) of the first furniture part, allowing for a tight fit between the parts when the plug (1) is firmly inserted.

In its first iteration, the joint of the present invention has been adapted for use in a collapsible table configuration. The overall design consists of only nine essential pieces and one optional element; four plugs (1), four hollow table legs (2) containing the square holes at the top, one table top (14) with four openings for the table legs and one optional sheet of glass (10). Assembly consists of three simple steps: (1) the top of the table leg is easily pushed through the square opening in the table top surface, its progress being stopped by the ledge where the leg becomes larger; (2) one of the four plugs is inserted into the square hole at the top of the table leg; and (3) the plug is then driven into the hole in the top of the table leg using a driving tool, such as a hammer. As the plug is driven further and further, the relief cuts at the top of the leg expand, trapping the table top in a firmly fixed position.

The entire method of using this invention takes less than three minutes even when performed by a very inexperienced person. The steps are self-evident and are, therefore, easy to follow. The apparatus and method of this invention require no hardware, and the only necessary tool is a hammer or mallet of some sort to drive the plug.

Disassembly of the collapsible furniture resulting from using the apparatus and method of this invention is even more effortless. The steps are as follows: (1) the table must be tipped on its side, so that the top and bottom of the leg are accessible; (2) a broom handle or a similar long, hard device is inserted into the bottom of the hollow leg; (3) pressure is applied to the broom handle to dislodge the plug from the square hole; (4) as each plug is removed, the legs can be removed from the table.

The apparatus and method of the present invention can be applied in connection with any type of furniture which would otherwise include a joint(s), including, but not limited to: chairs, desks, bookshelves, stools, beds, tables, etc. Although, the invention disclosed herein can be adapted to almost any usable size, and the resulting furniture can be built of almost any suitable material, including wood, metal and plastic.

Further, the apparatus and method disclosed herein is not limited to the exact details shown in the drawings, since equivalents and colorable imitations thereof will be evident to a person of ordinary skill in the art. Thus, the invention may be practiced otherwise than as specifically shown and described herein.

In short, use of the apparatus of this invention following the method disclosed and claimed herein results in collapsible furniture which can be easily transported and stored. The novel system of this invention is practically self-tightening, easy to follow and requires no hardware or tools other than a mallet and a stick resembling a broom handle. The design of this invention is easily fabricated en masse and simple, usually comprising nine essential parts.

What I claim is:

1. Collapsible furniture, comprising:
    a. a plug comprising a top side and a bottom side and four vertical sides, each vertical side tapering toward the bottom side, creating a four-sided, truncated pyramid;
    b. a first furniture part, comprising a top end and a bottom end, such first furniture part further comprising:
        i. a square hole at the top end for receiving the plug, the square hole comprising four corners and four receiving insides, the four receiving insides of the square hole being slightly smaller than the four vertical sides of the plug, each of the four corners having vertical relief cuts extending from the top end downward for two inches, capable of causing the receiving insides to expand outward at the same rate as the plug vertical sides when the plug is inserted into the square hole in order to securely fix the top end of the first furniture part to a second furniture part and to maximize surface area contact between the receiving insides and the vertical sides;
        ii. a hollow portion extending from the square hole to the bottom end;
        iii. a descending cut extending from the top end for several inches, resulting in a ledge capable of receiving another furniture part; and
    c. second furniture part, comprising an opening capable of joining the first furniture part and resting on the ledge of the first furniture part.

2. Collapsible furniture according to claim 1, wherein the material for constructing the collapsible furniture is selected from a group consisting of: wood, metal, or plastic.

3. Collapsible furniture according to claim 1, wherein the collapsible furniture is a table, comprising four plugs, four hollow table legs with square holes, and one table top with four openings for the table legs.

4. A method for assembling collapsible furniture, comprising the steps of:
    a. pushing a first furniture part through an opening in a second furniture part until a ledge of the first furniture part rests against the second furniture part;
    b. inserting a plug into a square hole on the first furniture part;
    c. driving the plug into the square hole using a driving tool until the plug is firmly seated in the square hole, causing four relief cuts in the square hole of the first furniture part to expand, trapping the first furniture part in a firmly fixed position.

5. Collapsible furniture according to claim 1, wherein the collapsible furniture is a table, comprising four plugs, four hollow table legs with square holes and one table top with four openings for the table legs and one sheet of glass.

* * * * *